United States Patent [19]

Charboneau et al.

[11] Patent Number: 4,591,839
[45] Date of Patent: May 27, 1986

[54] SYSTEM FOR DETECTING LOW LIQUID LEVEL AND PROBE THEREFOR

[75] Inventors: Ben J. Charboneau, Wixom; Richard D. Zerod, Union Lake, both of Mich.

[73] Assignee: Gulf & Western Manufacturing Company, Southfield, Mich.

[21] Appl. No.: 678,589

[22] Filed: Dec. 5, 1984

Related U.S. Application Data

[62] Division of Ser. No. 380,429, May 20, 1982, Pat. No. 4,506,258.

[51] Int. Cl.⁴ .................................. G08B 21/00
[52] U.S. Cl. ................................. 340/620; 73/304 R
[58] Field of Search ................. 340/620, 618; 338/27, 338/28; 73/304 R, 313

[56] References Cited

U.S. PATENT DOCUMENTS

| | | | |
|---|---|---|---|
| 2,337,608 | 12/1943 | Hulsberg | 73/313 |
| 2,499,575 | 3/1950 | Eddison et al. | 338/28 |
| 2,612,047 | 9/1952 | Nilsson et al. | 338/27 |
| 2,742,634 | 4/1956 | Bergen et al. | 340/510 |
| 2,804,517 | 8/1957 | Ferry | 200/84 |
| 2,901,740 | 8/1959 | Cutsogeorge | 340/599 X |
| 2,957,153 | 8/1959 | Greenberg | 338/28 |
| 3,350,710 | 10/1967 | Bridges | 340/515 |
| 3,376,568 | 4/1968 | Stewart et al. | 73/313 X |
| 3,547,145 | 12/1970 | Holzer | 73/304 X |
| 3,740,740 | 6/1973 | Milo | 73/295 X |
| 3,845,443 | 10/1974 | Fisher | 338/28 X |
| 3,911,744 | 10/1975 | Edwards | 73/304 R |
| 3,942,167 | 3/1976 | McClintock | 340/620 |
| 3,943,767 | 3/1976 | Efferson | 73/295 |
| 4,072,053 | 2/1978 | Anderson | 73/303 |
| 4,102,191 | 7/1978 | Harris | 73/313 |
| 4,163,391 | 8/1979 | Bezard et al. | 73/295 |
| 4,185,207 | 2/1980 | Bengtsson | 307/118 |
| 4,216,468 | 8/1980 | Kaufmann | 340/620 |
| 4,283,719 | 8/1981 | Williams et al. | 340/620 |
| 4,322,713 | 3/1982 | Duck et al. | 340/620 X |
| 4,361,038 | 11/1982 | Schuler | 73/295 |
| 4,470,301 | 9/1984 | Hutchins | 340/620 X |

Primary Examiner—James L. Rowland
Assistant Examiner—Jeffery A. Hofsass
Attorney, Agent, or Firm—Body, Vickers & Daniels

[57] ABSTRACT

A system for actuating a warning device when the level of a liquid in a receptacle is below a preselected level. This system includes a probe formed from a length of positive temperature coefficient wire whereby the resistance through the wire increases with increased temperature. This wire is mounted within the receptacle in a manner that allows the wire to be submerged in the liquid under normal conditions. A detection can be made when such wire is partially or completely out of the liquid. There is a first switching means in the system to apply a voltage across the wire and a detector means for actuating the warning device in response to an electrical characteristic of the wire as determined at a preselected control point in the circuit including the probe. In accordance with the preferred embodiment, the detector means includes a capacitor and a second switching means to ground the capacitor for a preselected time and then use the charged capacitor to follow the voltage of the probe. In this manner, the capacitor is charged rapidly toward a voltage determined by the temperature of the probe wire. After a selected time, the second switch means is deactivated so that the voltage supplied by the first switch means continues to heat the probe wire and increase the level of charge on the capacitor according to the resistance of the probe wire. If the wire is not covered sufficiently with the liquid, the voltage of the capacitor continues to increase. When it reaches a given value with respect to a reference voltage, the warning device is activated.

2 Claims, 17 Drawing Figures

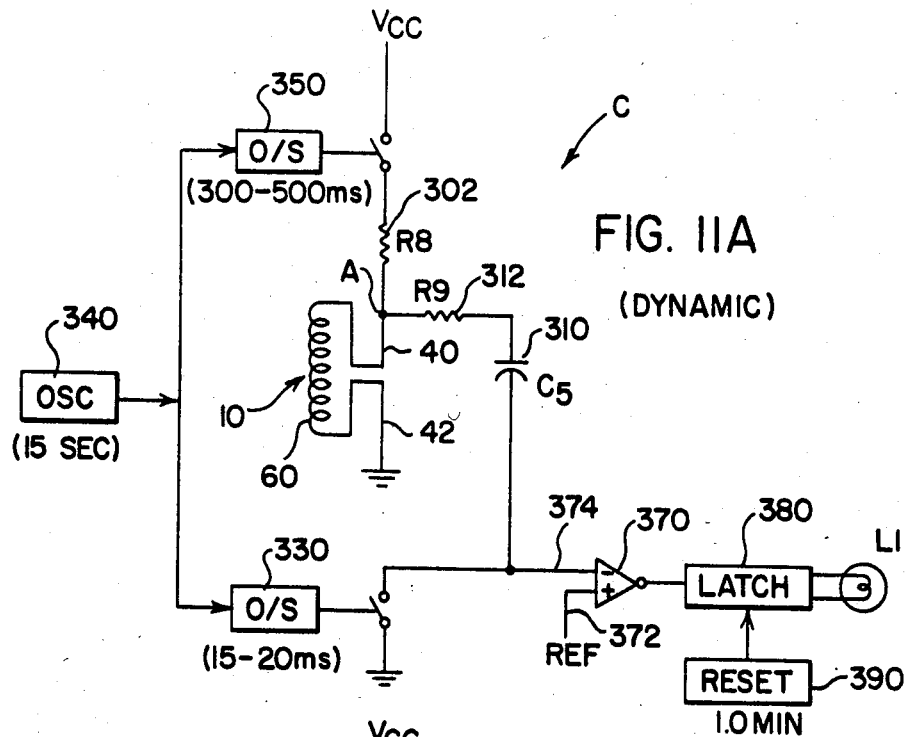
FIG. 11A (DYNAMIC)
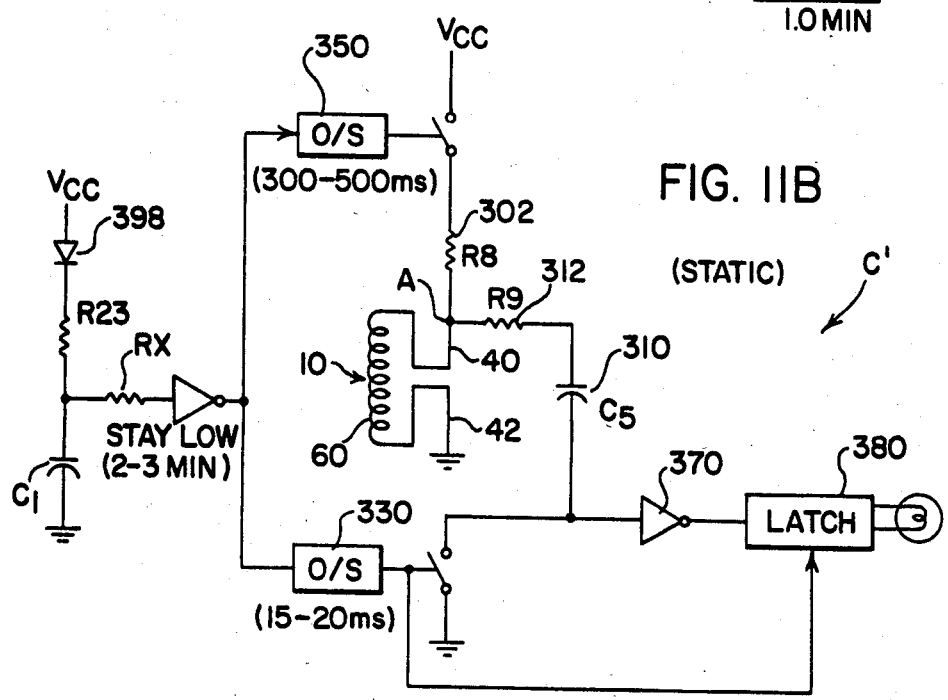
FIG. 11B (STATIC)

SYSTEM FOR DETECTING LOW LIQUID LEVEL AND PROBE THEREFOR

DISCLOSURE

The present invention relates to the art of detecting liquid level and more particularly to a system for detecting low liquid level and a probe to be used therewith.

BACKGROUND OF INVENTION

The present invention is particularly applicable for detecting a low level of fluid in the various portions of a motor vehicle, such as the radiator, oil pan, transmission housing, differential, master brake cylinder, etc. and it will be described with particular reference thereto; however, it should be appreciated that the invention has much broader applications and may be used for detecting low level in various liquid containing receptacles.

In the automotive field, a substantial amount of effort is being devoted to protecting the engine of a vehicle even when the vehicle is subjected to adverse conditions. One condition of general concern is unattended lack of sufficient liquid in various compartments or receptacles of a motor vehicle. If the level of liquid in certain receptacles becomes relatively low it is necessary to immediately replenish the liquid. Sufficient attention to this matter has become more difficult with the advent of self-service gasoline filling facilities. A driver may not recognize the necessity for inspecting the level of certain liquids on a periodic basis. In addition, motor vehicles are becoming more sophisticated and there is a desire to have warning lights on the dashboard for indicating areas of possible concern. These factors and others have contributed to the need for a satisfactory device to detect the level of liquid in various vehicle receptacles, espccially the oil pan below the crank case. This oil level is very difficult to monitor. As soon as the engine operates, oil is splashed by the rotating crank and the reciprocating connecting rods. This splashing and agitation can cause false readings on oil level. This is especially true in automatic detectors which have sensing devices within the oil pan for sensing low levels.

There is thus a need for a device which can detect low level of liquid, such as the oil in an oil pan, without being subjected to false readings due to splashing of the oil within the pan. Certain devices have been suggested for detection of low liquid levels. One of these devices is found in SAE publication 800127 by R. W. Tarpley et al entitled *Solid-State Automotive Liquid Level Sensing System*. In this article, a small silicon chip is used as the probe in a liquid container. As shown in FIG. 4 of this article, the silicon chip has a positive temperature coefficient so that as current is passed through the chip by applying a regulated voltage, the output voltage decreases. As the temperature of the chip increases, the resistance of the chip increases. This causes a corresponding increase in the voltage drop across the strip. Consequently, a reference level in the disclosed system decreases as the voltage decreases with an increase in voltage across the chip. If this measured voltage decreases to a greater extent than the reference voltage decreases, there is an indication that the chip is in air. This means low liquid level. If the chip is in oil, the decrease in voltage does not decrease to the continuously decreasing reference voltage. This indicates sufficient liquid level in the receptacle being monitored since the liquid around the chip dissipates any generated heat and keeps the chip cooled. This particular system has several limitations. First, this chip is difficult to assemble and regulate. The unit has a sharp demarcation. It will detect the absence of liquid at only the chip itself. This makes external adjustment of the probe very difficult and calibration of the system after assembly is not possible.

Another arrangmenet is illustrated in U.S. Pat. No. 4,283,719 wherein a probe is employed with a control circuit to detect low level by a differentiating circuit having a time constant so that the voltage sensitive means detects the rate of change of the voltage signal across the probe. This unit requires a relatively complex control circuit utilizing a continuous current flow through the probe between the positive bus and negative bus of the vehicle. This circuit can be modified to provide continuous monitoring or a single test at the start of the engine. In each instance, two separate circuits are required. One for maintaining the current flow through the probe and the other for detecting level with a probe.

In view of this background, there is still a need for a simplified arrangement which has universal application to various receptacles on the motor vehicle and which can detect a low liquid level accurately and with a minimum of circuit components.

THE INVENTION

The present invention provides a system and a probe for detecting low level of a liquid in a receptacle, such as the oil pan of a motor vehicle. This system is positive in operation, can be adjusted externally for different low level detection points and can be used at the start of an engine, before the oil is agitated, or during the operation of the engine, with minor modifications.

In accordance with the present invention, there is provided an improvement in a system as defined above, which improvement includes a detector having an input and an output and adapted to create a warning signal when the input reaches a preselected voltage. A control capacitor is connected between the input of the detector and a control point of a probe circuit. The probe circuit includes a positive temperature coefficient probe and a first switching device for applying a voltage across the circuit to cause a heating current to pass through the probe. In accordance with this improvement, a second switching means is provided for grounding the control capacitor for a preselected time so that the control capacitor is charged rapidly toward the voltage at the control point for a preselected short calibrating time. The basic switching means for the probe circuit itself is operated for a time period which is substantially longer than the calibrating time. Of course, the two switching means start at the same time and are coextensive during the calibrating time. Thus, the first switching means can be operated over a relatively long period of time such as 300-400 ms. The second switching means can be less than 10% of that value and be in the general range of 15-30 ms. Consequently, the measuring or control capacitor is rapidly charged for a short time and then charged gradually for a longer period of time. If the probe is in liquid, the capacitor charges to a voltage level proportional to the ambient temperature of the probe during the short initial or calibrating cycle. If the probe is out of the liquid, the voltage across the capacitor continues to increase as the resistance of the probe increases by current flow through the probe.

By using a probe including convolutions of positive temperature coefficient wire extending in a vertical direction, the operating point for the detector can be adjusted to be at various positions along the probe. This probe does not require movement of the probe for minor adjustments in the liquid level to be monitored. The operating point is selected by design of the circuit and probe configuration.

The primary object of the present invention is the provision of a system for detecting a low level of liquid in a receptacle, which system is solid-state, requires a relatively simple electrical circuit and can be adjusted without adjusting the probe within the receptacle itself.

Another object of the present invention is the provision of a system of the type defined above, which system can be operated rapidly to make a detection before liquid in the receptacle is agitated and/or splashed by operation of the equipment being monitored.

Yet another object of the present invention is the provision of a system as defined above, which system can be easily converted from a static, one-time operation device to a repetitive operation device with a minor amount of circuit modifications.

Yet another object of the present invention is the provision of a system as defined above, which system can be easily multiplexed and/or constructed with parallel components to monitor low level conditions in more than one receptacle on a motor vehicle or other equipment being monitored by a single system.

Still a further object of the present invention is the provision of a system as defined above, which system uses a probe employing positive temperature coefficient wire that is formed into a plurality of convolutions extending in the liquid level measuring direction, such as vertical, so that the desired low level to be detected can be adjusted without the need for adjusting the actual position of the probe within the receptacle.

Yet another object of the present invention is the provision of a probe for use in a solid-state detector system of the type defined above, which probe includes convolutions of wire formed from positive temperature coefficient material and extending in the measuring direction, normally vertical, so that the change in the resistance of the wire is gradual over the length of the probe to allow for external adjustment to change the detected low level for the system.

Still a further object of the present invention is the provision of a system as defined above, which system can preclude measurement of the liquid level for a time to allow for the liquid to become static.

These and other objects and advantages will become apparent from the following description.

BRIEF DESCRIPTION OF DRAWINGS

In this description, the following drawings are submitted:

FIG. 11A is a schematic wiring diagram illustrating operating characteristics of the diagram shown in FIG. 11;

FIG. 11B is a diagram similar to FIG. 11A depicting certain modifications in the circuit shown in FIG. 11 for converting the circuit from a dynamic operation to a static operation;

PREFERRED EMBODIMENTS

Figure 1:
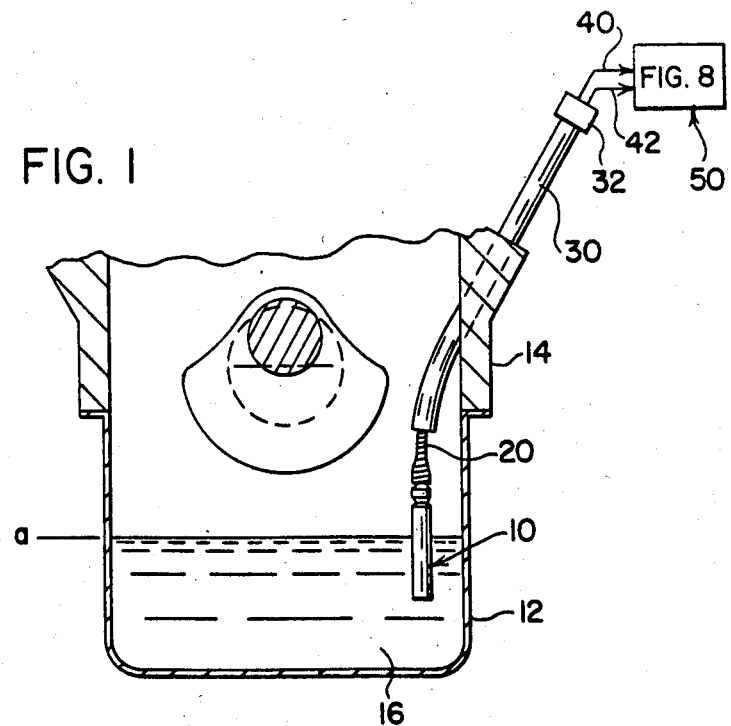
FIG. 1 is a partially cross-sectioned schematic view illustrating certain aspects of the present invention.
Figure 2:
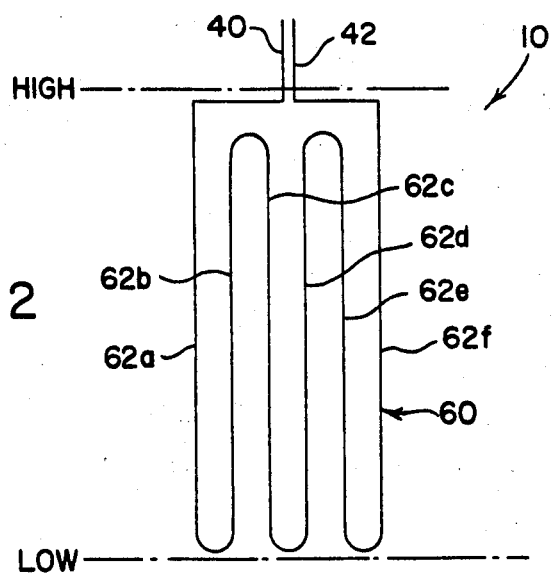
FIG. 2 is a graph showing certain features of the probe employed in accordance with the present invention.

Referring now to the figures wherein the showings are for the purpose of illustrating a preferred embodiment and not for the purpose of limiting same, FIG. 1 shows a probe 10 constructed in accordance with one aspect of the invention. The probe, which is best shown in FIGS. 3–4, 14 and 15, is mounted in a liquid receptacle illustrated as an oil pan 12 attached to the lower portion of internal engine block 14. Oil 16 in pan 12 has a level a when the engine is not operating. In accordance with this embodiment of the invention, a coiled metal wire 20 is used to support probe 10 at a position in pan 12 by passing through access tube 30. A stop cap 32 is used to control the vertical position of probe 10. Leads 40, 42 extend from the probe through coiled support wire 20 to allow for measurement of the resistance of wire 60 by an appropriate control circuit 50, best shown in FIG. 8. Referring now more particularly to FIG. 2, probe 10 includes a wire 60 formed from a positive temperature coefficient metal of the type well known in the art. In the preferred embodiment, Alloy 52 wire with a diameter approximately 3.0 mils is used. Alloy 52 is a nickel/iron alloy having a coefficient of approximately 3,000 PPM/C°. Of course, other wire which changes its resistance according to its temperature could be employed and is available. In probe 10, wire 60 is wrapped into elongated convolutions with legs 62a–62f which extend in a direction corresponding to the direction of change of the liquid level being sensed or monitored. In FIG. 2, both low and high levels are indicated. When probe 10 is submerged within oil 16, the liquid is above the convolutions formed by wire 60. This is the condition when sufficient oil is in the pan. If the oil level progresses downward along the convolutions of wire 60, the level of liquid or oil decreases to a value which indicates a need for additional oil. In FIG. 2, this position is illustrated as being below the wire 60; however, it can be anywhere along the wire. This feature of probe 10 allows it to be adjusted externally to control the actual low level detected by circuit 50. When a voltage is applied across leads 40, 42, current flows through wire 60. If the wire is completely submerged in liquid, the liquid dissipates the heat and maintains the temperature and thus the resistance of wire 60 relatively low. As the oil level progresses downwardly, a greater portion of wire 60 is in air. This allows heating of the exposed wire and an increased effective resistance across leads 40, 42. As the oil level drops, the resistance continues increasing. Larger portions of wire 60 are in the air. Heat caused by current flow through the wire actually heats the wire. The sensed voltage across wire 60 is used to create a warning light when the level of the oil reaches a preselected lower position as detected by the effective resistance of wire 60 between leads 40, 42.

Figure 3:
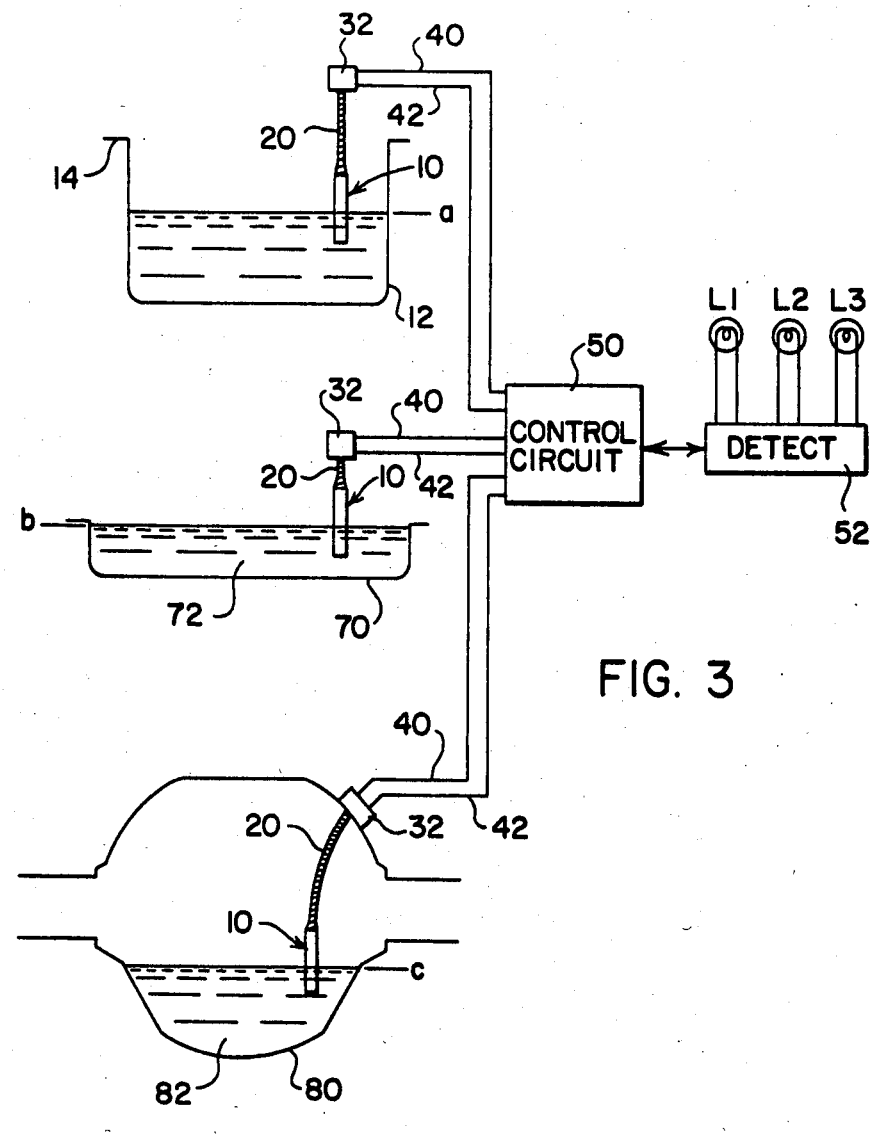
FIG. 3 is a schematic layout view of several probes used in various receptacles of a motor vehicle and controlled by a single monitoring circuit.
Figure 13:
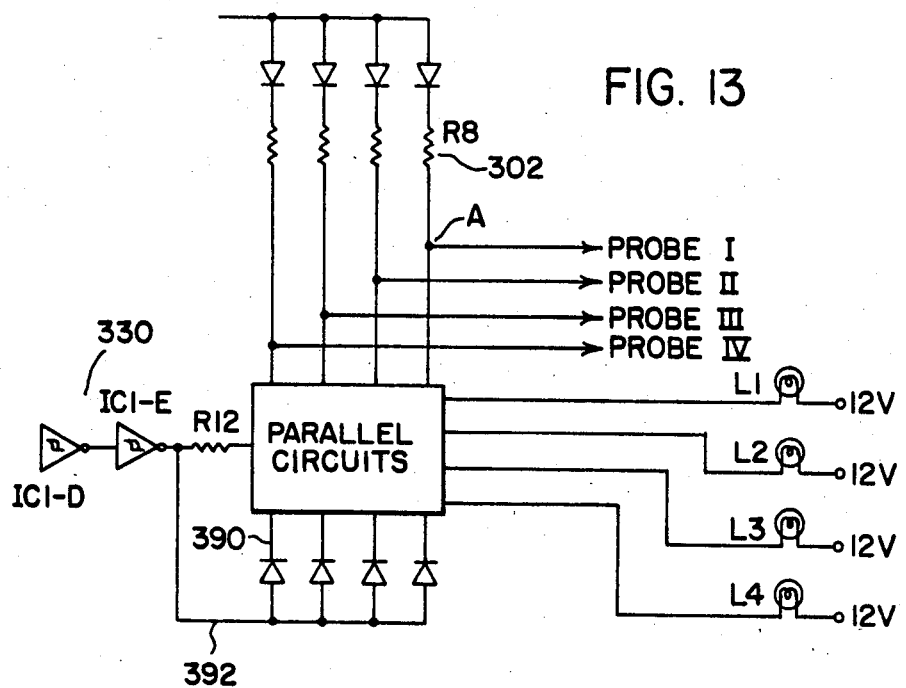
FIG. 13 is a partial view of an arrangement for monitoring several probes by sharing certain features of the circuit shown in FIG. 11.

The same type of probe 10 can be used in a plurality of reservoirs or receptacles in a motor vehicle. In FIG. 3, transmission pan 70 has a liquid 72 with a level b to be monitored by a probe connected to circuit 50. In a like manner, probe 10 can be used to measure the level c of fluid 82 in differential housing 80. All of these probes can be monitored by circuit 50 by multiplexing or using parallel components. The latter scheme is shown in FIG. 13. When the voltage drop across one of the probes 10 reaches a preselected value, circuit 50 creates a signal in the detect circuit 52 which actuates one of the warning lights L1, L2 or L3. FIG. 3 is illustrative in nature and indicates that probe 10 can be used in several locations and can be monitored by a single control circuit.

Figure 4:
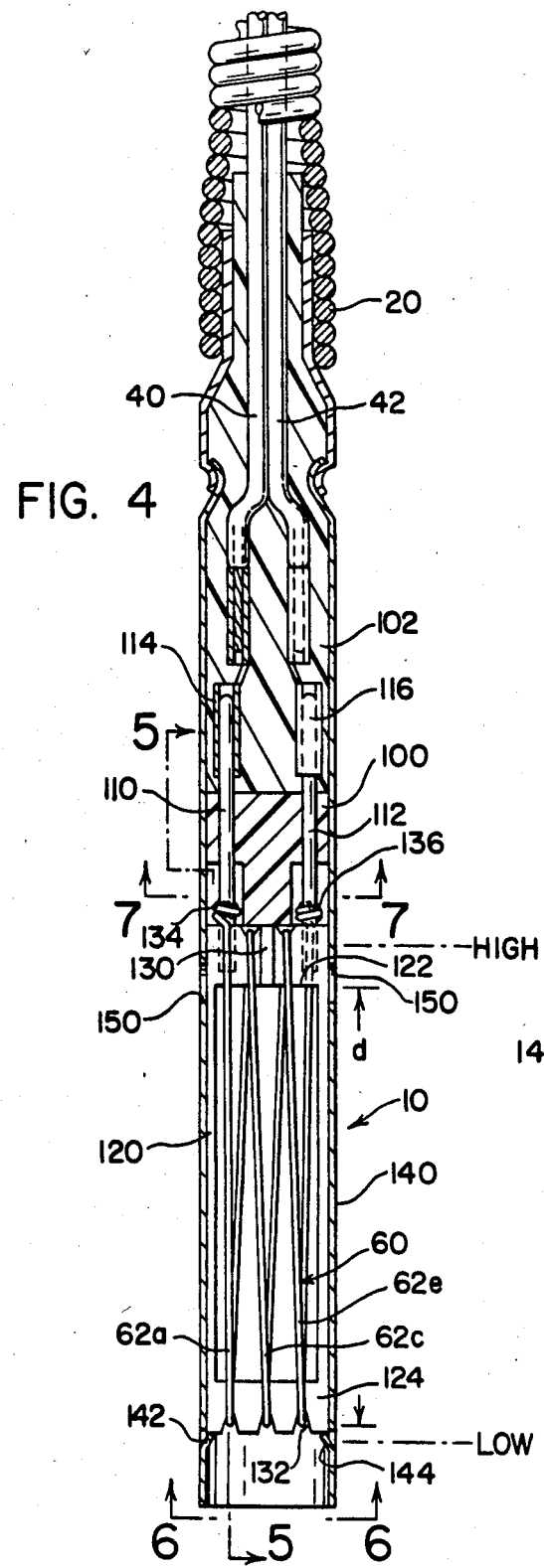
FIG. 4 is a cross-sectional view showing a probe constructed in accordance with the present invention.
Figure 5:
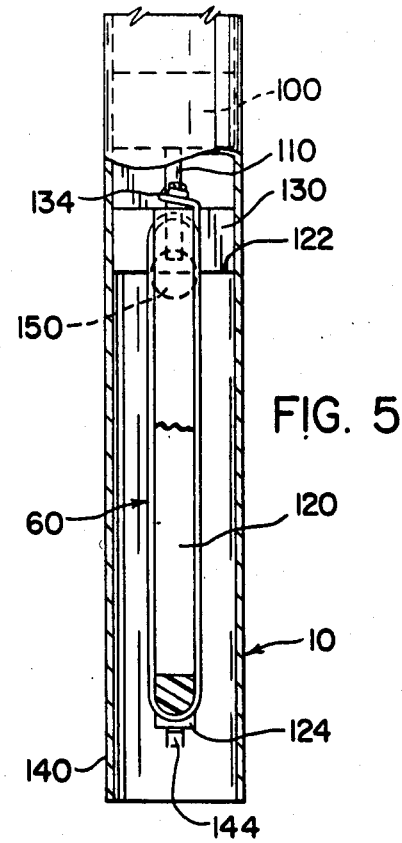
FIG. 5 is a partially cross-sectioned view taken generally along line 5—5 of FIG. 4.
Figure 6:
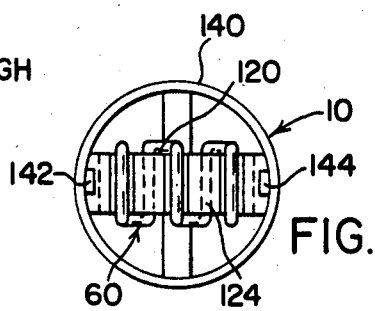
FIG. 6 is a cross-sectional view taken generally along line 6—6 of FIG. 4.
Figure 7:
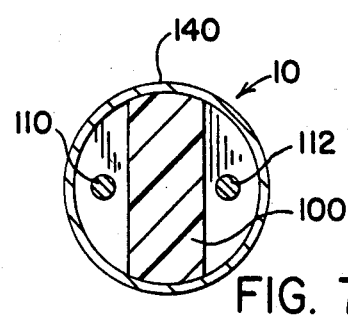
FIG. 7 is a cross-sectional view taken generally along line 7—7 of FIG. 4.

Referring more particularly to FIGS. 4-6, one version of probe 10 is illustrated. In this embodiment, plastic insulation member 100 is releasably secured to plastic member 102 by two prongs 110, 112 fixed within member 100. These prongs are receivable by connector sleeves 114, 116 to form an electrical connection with leads 40, 42. The hard plastic support frame 120 with ends 122, 124 and an upper support bar 130 is secured onto or abuts member 100. Wire 60 is wrapped endwise around ends 122, 124 which are spaced from each other a distance of about 1.0 inch. Knotches 132 receive wire 60 to form the convolutions and to maintain the wire convolutions spaced from each other. The ends of wire 60 are wrapped around and soldered to prongs 110, 112 at joints 134, 136. A cylindrical metal casing 140 has two crimped ears 142, 144 to hold rigid frame 120 in the casing. Spaced holes 150 allow for release of air as the casing 140 fills with oil. The effective resistance across prongs 110, 112 changes according to the temperature of wire 60. This change in resistance is used in control circuit 50 in a manner to be discussed later.

Figure 8:
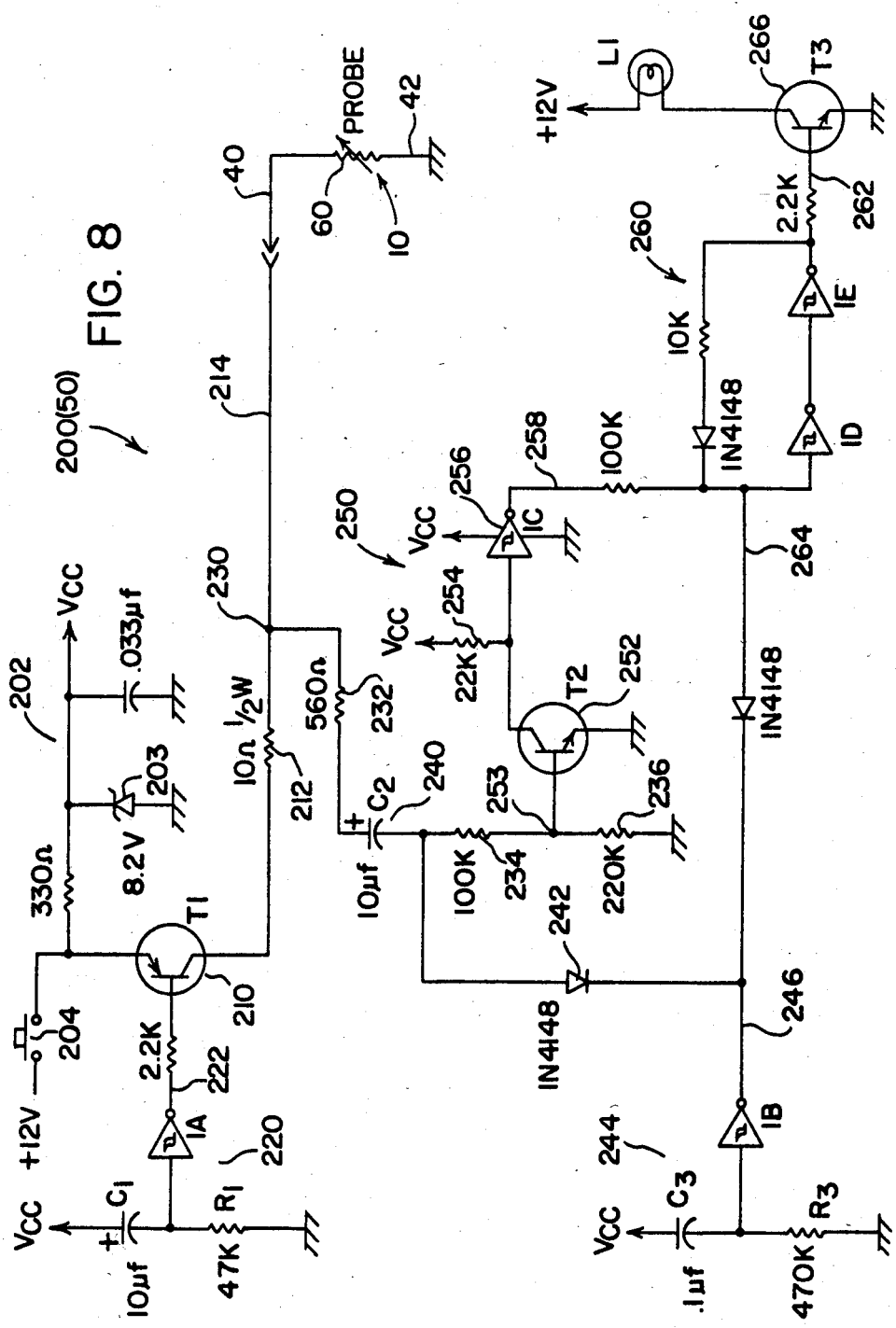
FIG. 8 is a wiring diagram of one embodiment of the present invention.

Referring now to FIG. 8, control circuit 50 is shown as a static circuit 200 where the level is measured only when the vehicle is first started. This is the most common mode of operation; however, a dynamic operation is possible wherein the level is monitored periodically. Circuit 200 includes a power supply 202 with a 8.2 volts Zener diode 203 for creating a control voltage $V_{CC}$ when the ignition switch 204 is closed. This voltage is usually 8.2 volts unless the battery voltage is lower than 8.2 volts. To heat wire 60 for purposes of testing the amount of wire within oil 16, the main circuit includes a first switching means, shown as transistor 210. When this transistor is conducting, current flows through resistor 212, line 214 and wire 60. This current flow heats wire 60 in accordance with the amount of exposed wire. The effective resistance or voltage across wire 60 is indicative of the level of liquid in pan 12. A one shot device 220 has an output 222 which is low for a cycle duration determined by values of C1, R1. In practice, this time duration is 200-500 milliseconds and is the measuring cycle for the control circuit. When output 222 shifts to a logic zero, transistor 210 conducts to pass current through wire 60 of probe 10. The condition of the probe is detected or measured from control point 230 which is connected to ground through resistors 232, 234 and 236 by a circuit that includes main control capacitor 240. As so far explained, control capacitor 240 (also C2) will be charged at a relatively slow rate which would be affected by the ambient temperature of wire 60 when transistor 210 is turned on. In accordance with one aspect of the invention, capacitor 240 is grounded during the initial part of the measuring cycle controlled by one shot device 220. Grounding of capacitor 240 through diode 242 is accomplished by a second one shot device 244 having an output 246. This output shifts to a logic zero, i.e. low voltage, for approximately 15-30 ms. As so far described, closing switch 204 creates voltage $V_{CC}$ which controls one shot devices 220, 244 to start a measuring or sampling cycle. Switching device or transistor 210 is switched immediately. In a like manner, capacitor 240 is immediately grounded through diode 242. After a short time (15-30 ms), diode 242 is reversed biased by a change in condition of output 246. Transistor 210 continues to conduct for the remainder of the measuring cycle, i.e. 200-500 ms. This allows capacitor 240 to be brought to the ambient condition of wire 60 before capacitor 240 is used to monitor the voltage and/or resistance of wire 60. This monitoring action is accomplished by a signal creating detector 250 having a transistor 252 coupled to the $V_{CC}$ voltage by resistor 254. The base of transistor 252 is connected to control point 253 so that the conduction of transistor 252 follows the voltage at this point. This voltage also corresponds with the voltage variations across wire 60 of probe 10. When voltage at point 253 reaches a preselected value, Schmidt trigger 256 is actuated. This causes holding or latch circuit 260 to be tripped by the signal on line 258. Reset line 264 is connected to the output 246 of one shot 244 for the purpose of resetting holding or latch circuit 260 at the start of each measuring cycle. When a signal appears in output 262, warning light L1 is actuated by current passage through transistor 266.

Figure 9:
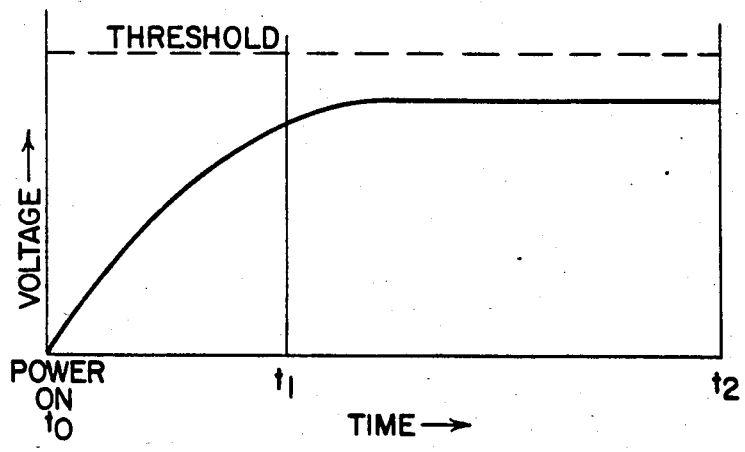
FIGS. 9 and 10 are graphs showing operating characteristics of the present invention, as illustrated in FIG. 8.
Figure 10:
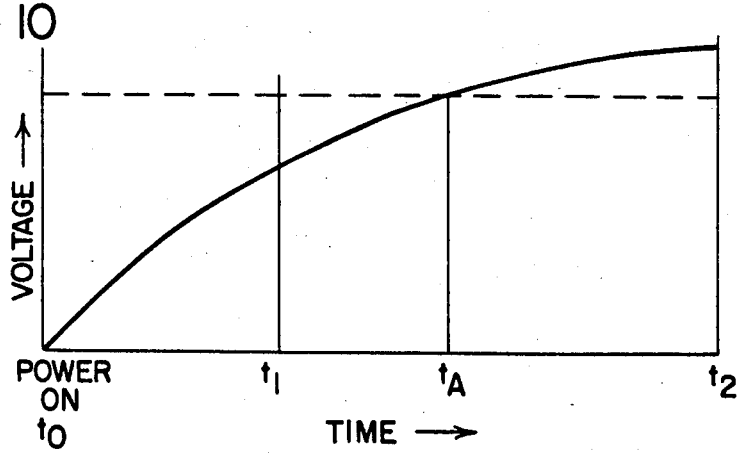

In operation of the control circuit 200 shown in FIG. 8, when the vehicle is started, switch 204 is closed. This immediately creates voltage $V_{CC}$ corresponding to the battery voltage of the vehicle. This actuates Schmidt trigger 1A of one shot device 220 to cause a low voltage in output line 222. This low voltage is applied to the base of transistor 210 to cause a voltage across wire 60 so that a heating current flows through resistor 212 and wire 60. At the same time, capacitor C3 of one shot device 244 is pulled upward. This causes a low voltage or logic zero in output line 246. Thus, the main control capacitor 240 is grounded and charged rapidly through resistors 212, 232 to a voltage corresponding with the probe voltage. Resistors 212, 232 provide a low time constant and the rapid charging of capacitor 240. After a short time, such as 15-30 ms, Schmidt trigger 1B shifts to a high logic in output 246. This blocks current flow through diode 242 and places control capacitor 240 in a charging circuit including resistors 234, 236 having higher resistances. Consequently, capacitor 240 now has a relatively high time constant so that it is charged slowly and follows the voltage across probe 10. If wire 60 of probe 10 is within the liquid a sufficient amount, the wire does not heat beyond a preselected amount. This causes the voltage to stabilize and the voltage across capacitor 240 to also stabilize. This condition is shown generally in FIG. 9 wherein the voltage on capacitor 240 is plotted as a function of time. The upper dash line is a theshold voltage which will cause creation of a warning signal. Time $t_1$ represents the time at which one shot device 244 connects capacitor 240 to ground. As can be seen in FIG. 9, the voltage across capacitor 240 does not build up to a value exceeding the threshold voltage. No detection is made. This is the normal operating condition for the system. If sufficient amount of wire 60 is out of liquid to indicate a low level, capacitor 240 continues to charge after $t_1$, as shown in FIG. 10. At a time $t_A$, the capacitor voltage exceeds the threshold voltage and a warning signal is created.

In FIG. 8 the voltage at point 253 controls conduction of transistor 252. This causes the input to Schmidt trigger 256 to shift downward. A positive signal is then created to toggle circuit 260 so that a high logic level appears at line 262. This causes conduction through transistor 266. Light L1 is then lighted and stays in that condition until circuit 260 is reset. This can be done by opening ignition switch 204. Line 264 assures that the circuit 260 is in the OFF condition at the start of a measuring cycle. A low voltage in line 246 resets holding circuit 260 at the same time it grounds capacitor 240.

Figure 11:
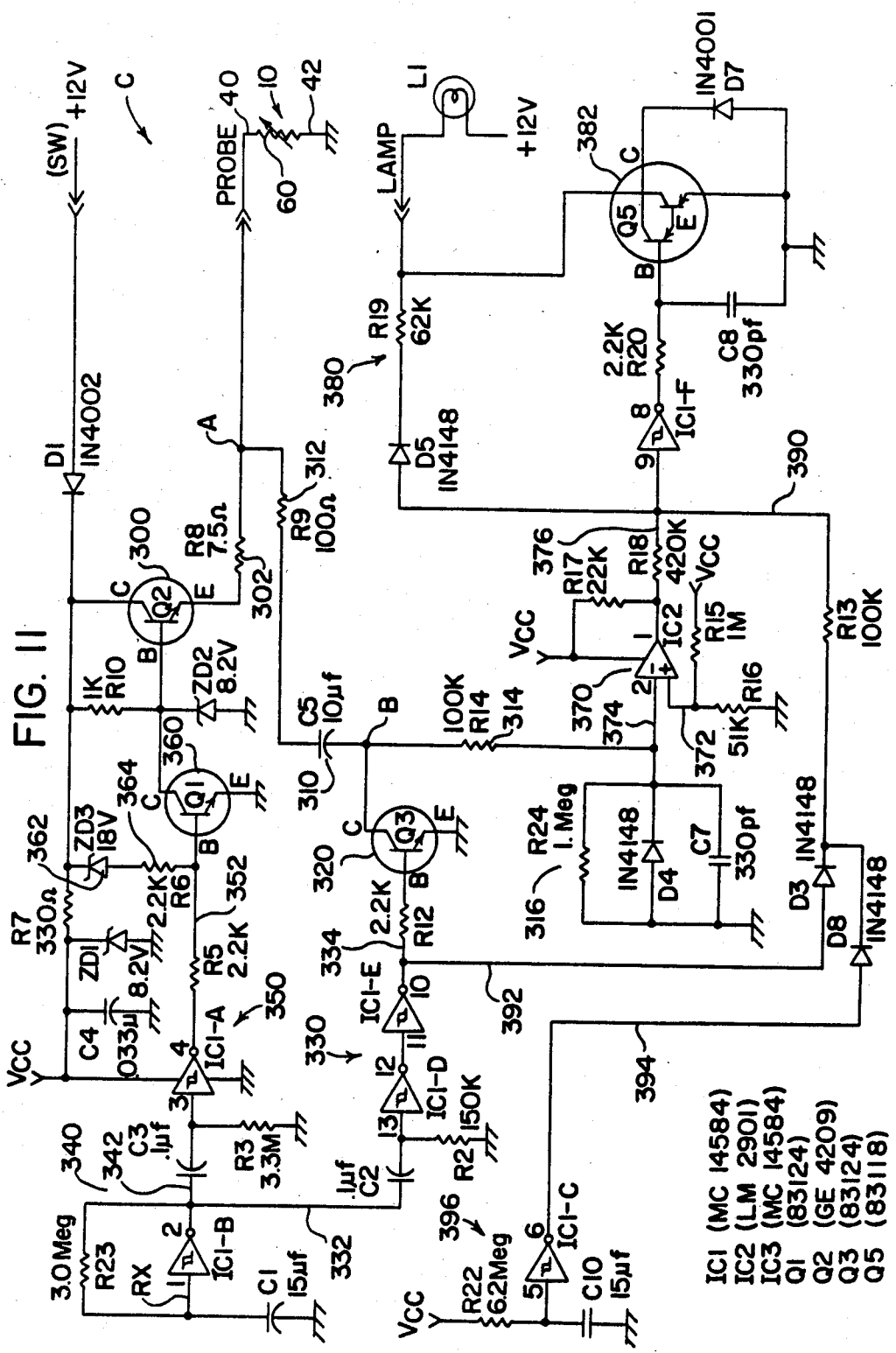
FIG. 11 is a wiring diagram showing the preferred embodiment of the present invention.

The preferred embodiment of the invention is shown in FIG. 11 and schematically in FIG. 11A. In this embodiment, main probe circuit C includes a first switching means or transistor 300 and a resistor 302 having a low resistance. This causes a high current flow through wire 60 when 12 volts is applied by switch line SW and through diode D1. At the same time, the $V_{CC}$ voltage is created. This voltage is tied to an 8.2 volt value by Zener diode ZD1. Basic control capacitor 310 corresponds with previously discussed capacitor 240. This control capacitor is generally in series with resistors 312, 314 and 316. Resistor 316 is relatively large for the purpose of bleeding current from the system to prevent a gradual build up of voltage across capacitor 310 during continuous operation of the control circuit C. Control point B generally follows the voltage drop across wire 60 of probe 10 as previously described. The second switching means in circuit C is transistor 320 which is turned on for 15-20 milliseconds by timing circuit 330 at the beginning of a probe measuring cycle. Timer or timing circuit 330 corresponds generally to one shot 244 shown in FIG. 8 and includes input 332 and output 334. When the logic on line 334 goes high, switch means 320 is energized to ground capacitor 310. In this embodiment, input 332 is connected to the output of an oscillator 340 which has an output line 342 that shifts to a logic one periodically. In practice, this shift occurs after about 15 seconds to create actuating pulses. During each of these pulses, switch 320 is turned on to ground control capacitor 310 so that the capacitor is charged to the ambient condition of probe 10. A pulse in output 342 also actuates a second timer 350 having an output 352. This timer corresponds with one shot device 220 of FIG. 8 and is used to control the total measuring or sampling cycle. To prevent high voltage from passing through probe 10, an intermediate transient protecting transistor 360 is used in circuit C. Zener diode 362 and resistor 364 assures that transistor 360 is on during high voltage conditions. When transistor 360 is on transistor 300 is off. During normal conditions, transistor 360 is biased OFF during the timing pulse in line 342. Consequently, transistor 300 is biased ON during this measuring or sampling cycle. In practice, the cycle duration is 300 milliseconds or over ten times the duration of the conducting period for transistor 320. It is noted that in this embodiment switching means or transistor 320 grounds capacitor 310 directly to circuit ground. This assures a rapid pull down of point B to provide the initial voltage on capacitor 310 at the start of a sampling or measuring cycle.

Oscillator 340 causes a sampling of the voltage across wire 60 each 15 seconds by creating a pulse in line 342. During each sampling period or cycle, transistor 320 grounds capacitor 310 for approximately 15-20 milliseconds. At the same time, switching device 300 is passing current through probe 10. This main current flow lasts for 300 milliseconds. If a sufficient amount of the wire on the probe is in air, the voltage point B continues to rise after transistor 320 is turned off. When the voltage rises a sufficient amount to indicate a low level in the receptacle being monitored by probe 10, comparator 370 is toggled. This comparator has a non-inverting input 372 controlled by a fixed reference voltage, in practice about 500 mv. When the voltage in inverting input line 374 increases beyond the reference amount, an output signal is created in line 376. This toggles holding or latch circuit 380 to cause Darlington transistor 382 to conduct. Lamp L1 is then lighted. Holding circuit 380 is reset by a high logic in line 390. This occurs when one shot device 330 is operated during the start of each timing cycle. This device applies a high pulse to line 392 and resets circuit 380.

Figure 12:
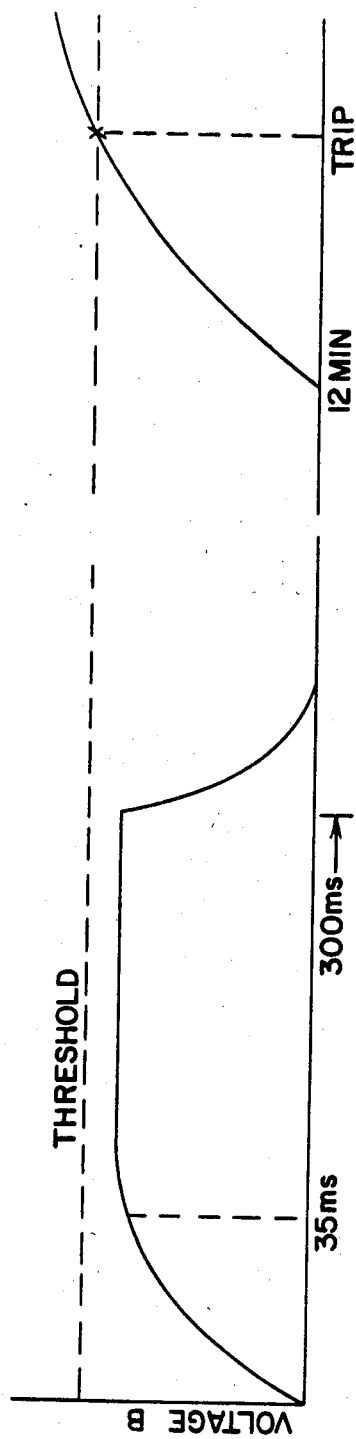
FIG. 12 is a voltage graph of the circuit shown in FIG. 11.

As so far described, circuit C is a dynamic circuit that monitors the condition of probe 10 periodically during operation of the vehicle. This is accomplished by oscillator 340 creating starting pulses each 15 seconds. These starting pulses each create a measuring or sampling cycle by actuating one shot device 330 to ground capacitor 310 and to actuate one shot device 350 to apply voltage across probe 10. This concept of both one shot devices operated in unison by oscillator 340 is shown generally in FIG. 11A. The resulting voltage at point B is shown in the graph of FIG. 12. If the resistance across wire 60 indicates a sufficient liquid level in the receptacle being monitored, the voltage at point B never reaches a value sufficient to toggle holding circuit 380. This is shown at the left of FIG. 12. At the right of FIG. 12 there is illustrated a situation where at some later time (12 minutes) the level of the liquid decreases below a preselected amount during a measuring cycle. At that time, capacitor 310 continues to charge after the stabilizing portion of the measuring cycle. When this happens the voltage in line 376 shifts to a low value to latch the output of gate IC1-F to a high logic. Holding circuit 380 could be various circuits; however, in practice a feedback circuit includes resistor R19 and diode D5. A noise suppressing capacitor C8 is used with a clamping diode D7. The logic in line 392 is a high logic during the initial portion of the timing cycle to reset holding circuit 380 and maintain it reset until after initial charging of Capacitor 310. In the illustrated embodiment, there is an override circuit 396 which includes a one shot device to create a high blocking logic in line 394 for a substantial amount of time. This high logic in line 394 prevents operation of holding circuit 380 for a given interval which, in practice, is one minute. Thus, lamp L1 can not be operated because of low battery voltage that may occur when the starter of a vehicle is being operated.

Circuit C can be modified from a dynamic circuit operating continuously as schematically illustrated in FIG. 11A to a static circuit by slight modifications as schematically represented in FIG. 11B. The static control circuit C' does not include overriding circuit 396. Resistor R23 of oscillator 340 is connected to voltage $V_{CC}$ through a forward bias diode 398. In this manner, oscillator 340 is converted to a one shot device. In practice, a resistor RX is placed at the position indicated as RX in FIG. 11 This causes capacitor C1 to discharge slowly. Thus, the device C' will not operate until a preselected period after the engine has been turned off. This allows the oil to drain back into the pan. At the next operation of switch SW, the circuit will not operate until 2-3 mintues have elapsed. This is the time for discharging capacitor C1. These modifications of circuit C are shown in FIG. 11B. By making these slight modifications, circuit C can be converted into a static circuit C'. By using these same modifications, a one shot device could be placed before one shot device 220 in FIG. 8. This additional one shot device would assure that the oil is in a static condition before starting the measuring cycle. Upon starting, the modified input circuit does not cause a delay. As long as capacitor C1 has had time to discharge, an immediate pulse is provided to the input of one shot device 350. As can be seen, the modification to the input side of the circuit becomes a factor only when the engine has not been turned off a preselected amount of time determined by the discharge through resistor RX as shown in FIG. 11B. In that instance, the circuit does not create a measuring cycle that could give a misleading result.

Figure 14:
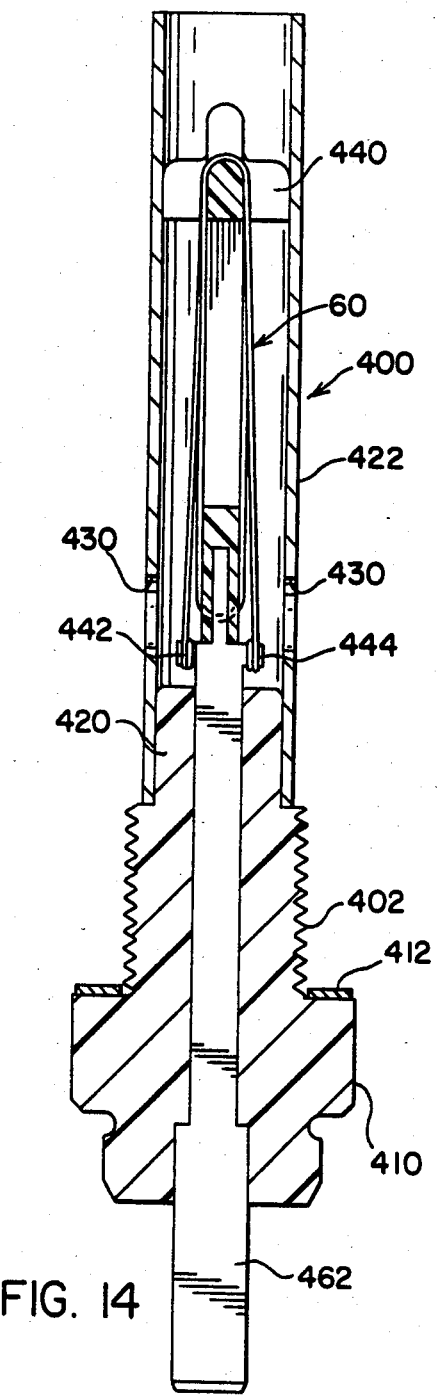
FIG. 14 is an enlarged cross-sectional view showing the preferred embodiment of the probe used in FIG. 11; and, FIG. 15 is a partially cross-sectioned view of the probe shown in FIG. 14 after it is rotated 90°.
Figure 15:
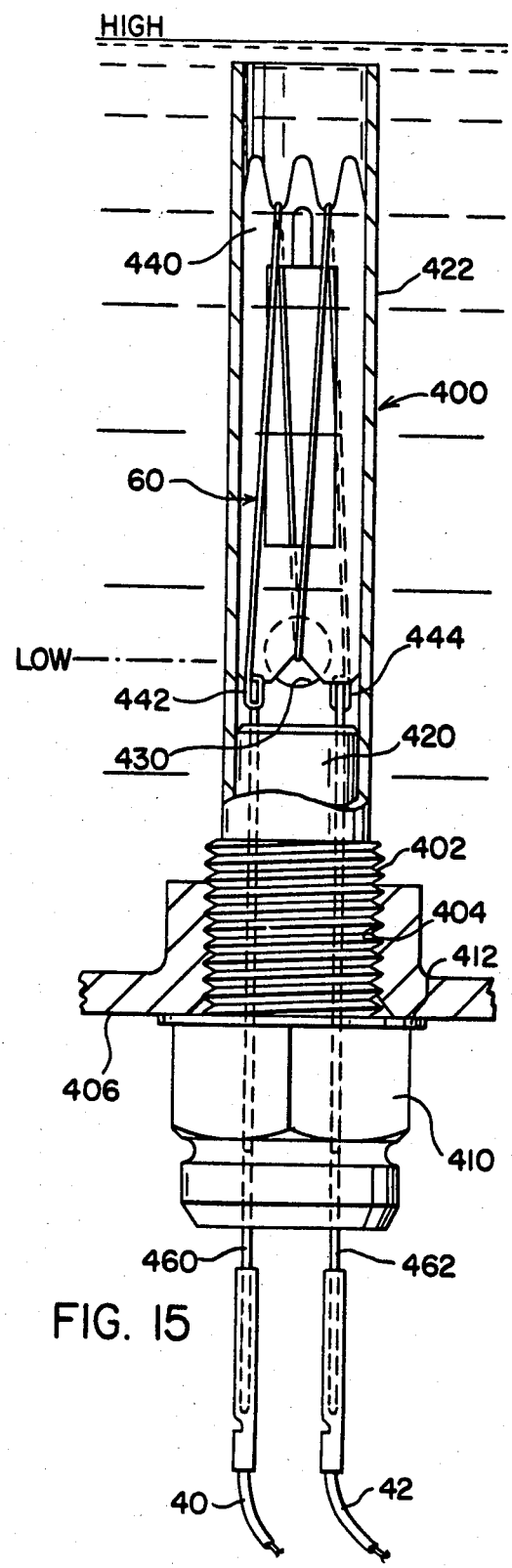

Referring now to FIG. 13, there is a schematic circuit that uses several probes (I-IV). These probes can be monitored by the same circuit as shown in FIG. 11. In this particular example, each circuit shares components, such as one shot device 330. It is intended that such common use of the circuit components for the purpose of monitoring more than one probe 10 can be done as shown in FIG. 13. In addition, a multiplexing arrangement can be used by inputting information to a single circuit C from different probes on a time share basis to control different lights. This would be true multiplexing of the control system for several probes A modified probe 400 is shown in FIGS. 14 and 15. This probe is the preferred embodiment. Probe 400 is similar to probe 10; however, it includes a threaded base 402 screwed into a threaded aperture 404 at the lower wall 406 of the receptacle to be monitored. Wrench receiving head 410 of base 402 supports outwardly extending leads 40, 42 extending from internal wire 60 generally as described with regard to probe 10. A gasket 412 seals aperture 404 after probe 400 has been installed within the receptacle. A nose 420 receives an upwardly extending sleeve 422 having outwardly directed holes 430 near nose 420. An internal plastic frame 440 is used to support wire 60 in a plurality of convolutions extending generally in the vertical direction. The ends of wire 60 are connected at junctions 442, 444 to complete an electrical circuit through prongs 460, 462 that are attached by standard connectors onto the ends of leads 40, 42. Sleeve 422 prevents splashing of oil onto wire 60.

Components of the circuit shown in FIGS. 8 and 11 can be interchanged to perform the same functions. Even though wire 60 is shown with its legs vertically, it can be mounted in the receptacle with the legs horizontal. The voltage graphs in FIGS. 9, 10 and 12 show that the control capacitors charge slightly after the ground condition is terminated; however, the ground is for a sufficient time to bring the capacitor rapidly to a voltage representing the ambient condition of the probe.

Having thus described the invention, the following is claimed:

1. A probe for use in a system of the type that actuates a warning device when the level of a liquid in a receptacle is below a preselected level, said probe comprised of: a base portion having means for mounting said probe with respect to said receptacle; an elongated frame extending from said base portion having spaced wire engaging portions at the ends thereof; a length of positive temperature coefficient wire having properties wherein the resistance across said wire increases with increased wire temperature, said wire being wound about the axial ends of said elongated frame to form convolutions about said frame, said convolutions having elongated, generally parallel portions of said wire extending axially along said frame; and shielding means radially surrounding and spaced from said elongated, generally parallel portions of said wire, said shield having apertures therein located generally adjacent the ends of said frame to allow flow of said liquid through said sleeve to effect quiescent engagement of said liquid with said wire when said probe is vertically positioned in said receptacle.

2. A probe as defined in claim 1, wherin said shielding means is a cylindrical sleeve surrounding said frame.

* * * * *